United States Patent
Hua et al.

(10) Patent No.: US 10,643,356 B2
(45) Date of Patent: May 5, 2020

(54) METHOD AND GAME-BASED SYSTEM FOR PARTITIONING OF STREAMING GRAPH

(71) Applicant: Huazhong University of Science and Technology, Wuhan, Hubei (CN)

(72) Inventors: Qiangsheng Hua, Hubei (CN); Xuanhua Shi, Hubei (CN); Hai Jin, Hubei (CN); Yangyang Li, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 16/237,053

(22) Filed: Dec. 31, 2018

(65) Prior Publication Data
US 2019/0244402 A1 Aug. 8, 2019

(30) Foreign Application Priority Data
Feb. 2, 2018 (CN) .......................... 2018 1 0108725

(51) Int. Cl.
*G06T 11/20* (2006.01)
*G06F 16/901* (2019.01)
*G06F 16/2458* (2019.01)

(52) U.S. Cl.
CPC ........ *G06T 11/206* (2013.01); *G06F 16/2465* (2019.01); *G06F 16/9024* (2019.01); *G06F 2216/03* (2013.01)

(58) Field of Classification Search
CPC ............... G06T 11/206; G06F 16/2465; G06F 16/9024; G06F 2216/03
See application file for complete search history.

(56) References Cited

U.S. PATENT DOCUMENTS

| 6,532,469 B1* | 3/2003 | Feldman | G06F 16/358 707/750 |
| 10,437,648 B2* | 10/2019 | John | G06F 9/5083 |
| 2005/0160404 A1* | 7/2005 | Nachmanson | G06F 11/3676 717/124 |
| 2013/0091266 A1* | 4/2013 | Bhave | H04L 67/025 709/224 |
| 2015/0220530 A1* | 8/2015 | Banadaki | G06F 16/90 707/723 |

(Continued)

*Primary Examiner* — Yu Chen
(74) *Attorney, Agent, or Firm* — Michael X. Ye; Morris, Manning & Martin, LLP

(57) ABSTRACT

The present invention relates to a game-based method and system for streaming-graph partitioning, the method comprises: partitioning a streaming graph using one or more processors, the one or more processors being configured to: read an edge streaming having a predetermined number of edges in an unpartitioned area of the streaming graph as a sub-graph; based on a first pre-partitioning model, pre-partition the edges of the sub-graph to at least two partition blocks as an initial state of a game process; and sequentially select an optimal partition block for each edge of the sub-graph through the game process until the game process becomes convergent, the disclosed method and system can partition streaming graph using local information only, without loading the whole streaming graph into the memory, thus have good scalability and support dynamic graph partitioning; the disclosed partitioning method and system can provide better partitioning results.

9 Claims, 6 Drawing Sheets

(56) References Cited

U.S. PATENT DOCUMENTS

| | | | |
|---|---|---|---|
| 2015/0269211 A1* | 9/2015 | da Silva | G06F 16/285 707/725 |
| 2017/0091246 A1* | 3/2017 | Risvik | G06F 16/182 |
| 2019/0354518 A1* | 11/2019 | Zochowski | G06F 16/2379 |

* cited by examiner

FIG. 1a
FIG. 1b
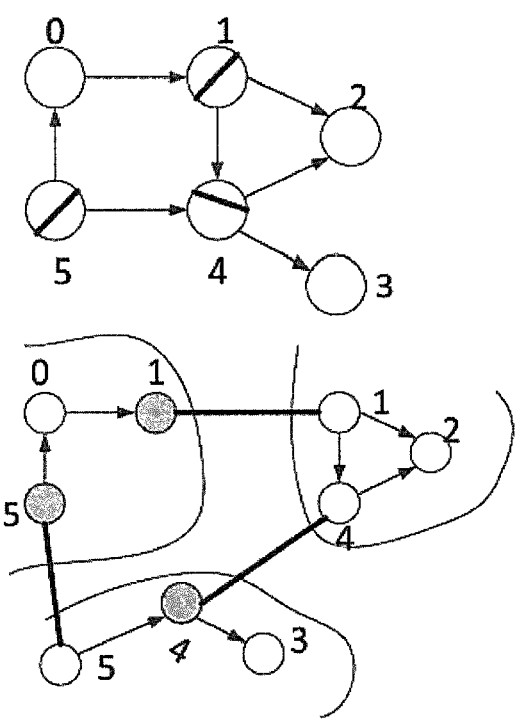
FIG. 1c
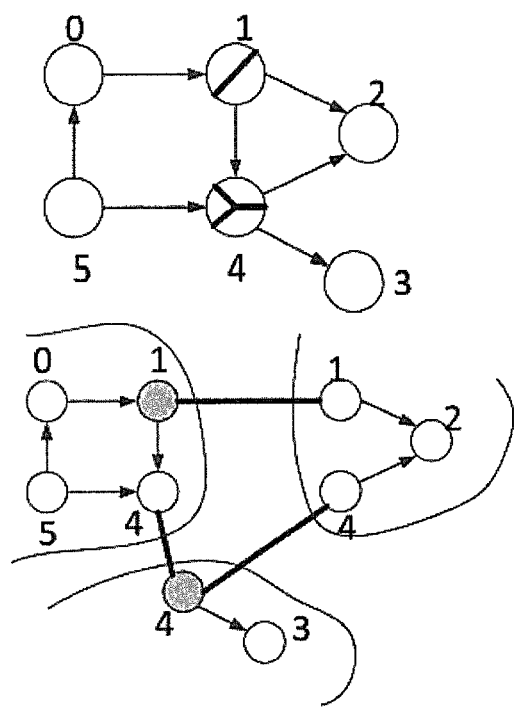
FIG. 1d

FIG. 3a
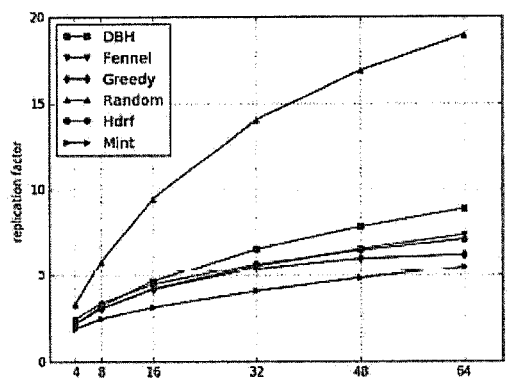
FIG. 3b
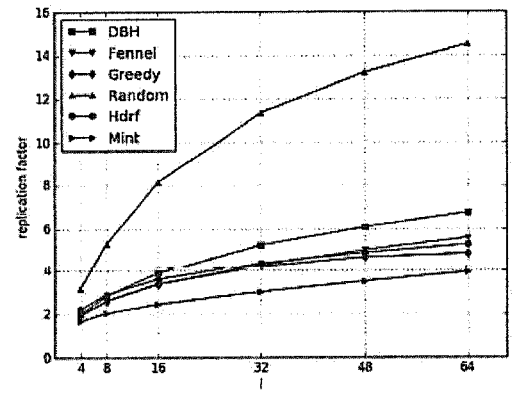
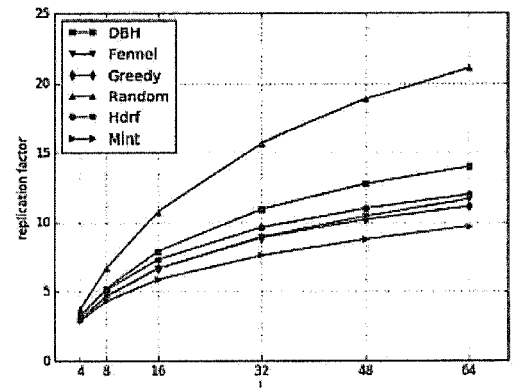
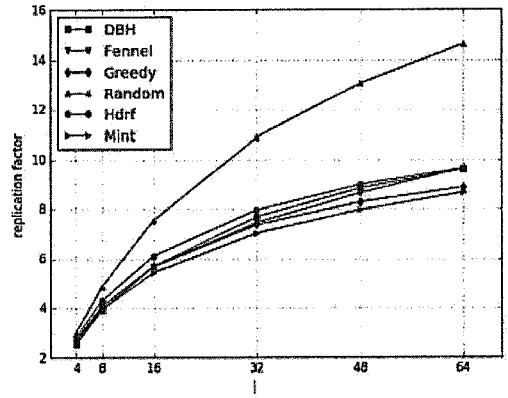
FIG. 3c
FIG. 3d

METHOD AND GAME-BASED SYSTEM FOR PARTITIONING OF STREAMING GRAPH

FIELD

The present invention relates to processing of streaming graphs, and more particularly to a game-based method and system for partitioning of streaming graph.

DESCRIPTION OF RELATED ART

Graph data mining is presently a popular research topic and is mainly focused on finding out solutions from properties of a given graph dataset, such as PageRank, connected component (CC), and betweeness centrality. These properties provide information for measuring the significance of points in the graph. For example, a search engine may use PageRank to rank pages, and betweeness centrality is a matric for social media influence. These graph properties have extensive application scenarios.

Due to memory limitation, a normal stand-alone computer is less capable of processing mass graph data, and needs the assistance of a distributed system. For processing graph data in such a distributed system, one natural question is how to layout graph data across machines in the distributed system in a reasonable way. This is a typical application of graph partitioning. There are two ways to improve performance of a distributed system. The first method is to equilibrate operational loadings among machines in the system, which means to try the best to make the machines have the same number of edges. The second method is to minimize communication between the machines, which means to make the connections bridging different machines as few as possible, as depicted in FIG. 1. The two points when applied to the context of graph partitioning are two norms to typical graph partitioning issues: 1. making edges (vertexes) in each partition block as equal as possible; 2. Making points (edges) running across different partition blocks as few as possible.

However, the typical graph partitioning issues, whether it is with edge partitioning or with vertex partitioning, are both NP-hard. Presently, the partitioning methods practically used are all based on heuristic algorithms. Depending on whether global information of the graph is required for partitioning, these algorithms can be divided into streaming graph partitioning and non-streaming graph partitioning. For non-streaming graph partitioning method, the whole graph has to be loaded into the memory, and global information of the graph such as the degrees of vertexes is essential for partitioning. For example, METIS is a typical approach to non-streaming graph partitioning. The basic principle is to condense the plural vertexes in a graph into one vertex, so as to significantly reduce the number of points in the graph. Then in the coarsened graph, the K.L. algorithm with relatively high complexity is used for partitioning. At last, the partitioned, coarsened graph is reduced to the original graph. While such a method provides relatively good partitioning results, the coarsening process of METIS requires memory for storing a huge amount of intermediate results in addition to the memory occupied by the graph data. Therefore, this known method is only suitable for where the graph data set is small and is less scalable.

On the other hand, streaming graph partitioning is based on a stream processing model, wherein a graph is achieved through edge streaming or vertex streaming (including its adjacent points), the partitioning to each edge (vertex) can be simply determined according to the present edge (vertex) and the edges (vertexes) that have arrived, making it have good scalability and support dynamic graphs (allowing dynamic increase of edges or vertexes of the graph). The algorithms based on vertex streaming include LDG and FENNEL, and the algorithms based on edge streaming include HDRF. The defect of known methods of streaming graph partitioning is that, only a single round calculation of the minimal cost function is performed for each edge before strategy selection, hence the local optimal value so obtained is inferior.

SUMMARY OF THE INVENTION

In view of the shortcomings of the prior art, the present invention provides a game-based method and system for partitioning of a streaming graph. The present invention avoids the defects of non-streaming graph partitioning about large memory use and less scalability, and performs streaming partitioning in a game process by leveraging information of other players' strategy selection in the current round, or in which partition block the other edges and/or vertexes are currently placed, so as to achieve better decision-making and better partitioning results.

According to one preferred mode, a game-based method for streaming-graph partitioning, the method comprising: partitioning a streaming graph using one or more processors, the one or more processors being configured to: read an edge streaming having a predetermined number of edges in an unpartitioned area of the streaming graph as a sub-graph; based on a first pre-partitioning model, pre-partition the edges of the sub-graph to at least two partition blocks as an initial state of a game process; and sequentially select an optimal partition block for each edge of the sub-graph through the game process until the game process becomes convergent; wherein the game process comprises: considering a set of all the partition blocks as a set of strategy selections, in every round of the game process, calculating for the current edge that is under strategy selection currently its optimal strategy selection in the present round according to partitioning situations of the other edges in a current partitioning result and according to a predetermined cost function, when the current edge is not in the optimal partition block corresponding to the optimal strategy selection, moving the current edge to its optimal partition block and correspondingly updating the current partitioning result as a basis of strategy selection for the next edge and performing the game process again with the latest current partitioning result after the strategy selections for all the edges of the sub-graph has been done; wherein the predetermined cost function is:

$$c(e_{(u,v)}, p_i) = \alpha\beta l(p_i) + (1-\alpha)\left(\frac{1}{d(p_i, u)} + \frac{1}{d(p_i, v)}\right);$$

and wherein $p_{min} = \mathrm{argmin}_{i \in [1,k]} c(e_{(u,v)}, p_i)$ is the optimal partition block where the value of the cost function is minimal, and when the edge $e_{(u,v)}$ is in a partition block that is not its optimal partition block, move the edge $e_{(u,v)}$ from the partition block it has been in to its optimal partition block; wherein $e_{(u,v)}$ denotes the edge connecting vertex u and vertex v, $p_i$ denotes the partition block numbered as i, $i \in [1]$, k is the number of the partition blocks, wherein $k \geq 2$ and is an integer, α denotes relative importance between a load balance factor and a replication factor, wherein $\alpha \in (0, 1)$, β denotes a factor normalization parameter, $l(p_i)$ denotes the number of edges in partition block $p_i$, $d(p_i, u)$ denotes the degree of vertex u in partition block $p_i$, and $d(p_i, v)$ denotes the degree of vertex v in partition block $p_i$.

According to one preferred mode, the game process further comprises: if in one round of the game process, none of the edges are moved, determining that the present game process is convergent and partitioning of the sub-graph is completed, and taking the current partitioning result on which the present round of the game process is based as a final partitioning result.

According to one preferred mode, the step of moving the current edge to its optimal partition block and correspondingly updating the current partitioning result as a basis of strategy selection for the next edge comprises: the strategy selection of the current edge depending on partitioning situations of all the edges other than the current edge in the updated current partitioning result.

According to one preferred mode, the predetermined cost function is:

$$c(e_{(u,v)}, p_i) = \alpha\beta l(p_i) + (1-\alpha)\left(\frac{1}{d(p_i, u)} + \frac{1}{d(p_i, v)}\right);$$

and given that $p_{min} = \mathrm{argmin}_{i\in[1,k]} c(e_{(u,v)}, p_i)$ is the optimal partition block where the value of the cost function is minimal, and when the edge $e_{(u,v)}$ is in a partition block that is not its optimal partition block, move the edge $e_{(u,v)}$ from the partition block it has been in to its optimal partition block; wherein $e_{(u,v)}$ denotes the edge connecting vertex u and vertex v, $p_i$ denotes the partition block numbered as i, $i\in[1,k]$, k is the number of the partition blocks, $k\geq 2$ and is an integer, $\alpha$ denotes relative importance between a load balance factor and a replication factor, $\alpha\in(0,1)$, $\beta$ denotes a factor normalization parameter, $l(p_i)$ denotes the number of edges in partition block $p_i$, $d(p_i,u)$ denotes the degree of vertex u in partition block $p_i$, and $d(p_i,v)$ denotes the degree of vertex v in partition block $p_i$.

According to one preferred mode, the factor normalization parameter $$\beta \in \left[\frac{|M|}{|E|^2}, \frac{k^2|M|}{|E|^2}\right],$$

wherein $|M|$ is the number of vertexes in the sub-graph, $|E|$ is the number of edges in the sub-graph.

According to one preferred mode, the first pre-partitioning model successively generates a random number R for the edge of the sub-graph according to a random partitioning rule, and partitions the edge to the partition block $p_R$ that is numbered corresponding to the random number, wherein $R\in[1,k]$ and is an integer, k is the number of the partition blocks, and $k\geq 2$ and is an integer.

According to one preferred mode, the one or more processors are further configured to: acquire a plurality of the sub-graphs and the final partitioning results of these sub-graphs to for a train set; use the train set to train a second pre-partitioning model; and after the training has been conducted for a predetermined number of times, use the second pre-partitioning model instead of the first pre-partitioning model to pre-partition the sub-graph to be partitioned.

According to one preferred mode, the step of reading the edge streaming having the predetermined number of edges in the unpartitioned area of the streaming graph as the sub-graph is performed according to a stream processing model.

The present invention further discloses a game-based system for streaming-graph partitioning, the system comprising: one or more processors; the one or more processors being configured to: read an edge streaming having a predetermined number of edges in an unpartitioned area of a streaming graph as a sub-graph; based on a first pre-partitioning model, pre-partition the edges of the sub-graph to at least two partition blocks as an initial state of a game process; sequentially select an optimal partition block for each edge of the sub-graph through the game process until the game process becomes convergent; wherein the game process comprises: considering a set of all the partition blocks as a set of strategy selections, in every round of the game process, calculating for the current edge that is under strategy selection currently its optimal strategy selection in the present round according to partitioning situations of the other edges in a current partitioning result and according to a predetermined cost function, and when the current edge is not in the optimal partition block corresponding to the optimal strategy selection, moving the current edge to its optimal partition block and correspondingly updating the current partitioning result as a basis of strategy selection for the next edge and performing the game process again with the latest current partitioning result after the strategy selections for all the edges of the sub-graph has been done; wherein the predetermined cost function is:

$$c(e_{(u,v)}, p_i) = \alpha\beta l(p_i) + (1-\alpha)\left(\frac{1}{d(p_i, u)} + \frac{1}{d(p_i, v)}\right);$$

and wherein $p_{min} = \mathrm{argmin}_{i\in[1,k]} c(e_{(u,v)}, p_i)$ is the optimal partition block where the value of the cost function is minimal, and when the edge $e_{(u,v)}$ is in a partition block that is not its optimal partition block, moving the edge $e_{(u,v)}$ from the partition block it has been in to its optimal partition block; wherein $e_{(u,v)}$ denotes the edge connecting vertex U and vertex v, $p_i$ denotes the partition block numbered as i, $i\in[1,k]$, k is the number of the partition blocks, wherein $k\geq 2$ and is an integer, $\alpha$ denotes relative importance between a load balance factor and a replication factor, wherein $\alpha\in(0,1)$, $\beta$ denotes a factor normalization parameter, $l(p_i)$ denotes the number of edges in partition block $p_i$, $d(p_i, u)$ denotes the degree of vertex u in partition block $p_i$, and $d(p_i, v)$ denotes the degree of vertex v in partition block $p_i$.

According to one preferred mode, the game process further comprises: if in one round of the game process, none of the edges are moved, determining that the present game process is convergent and partitioning of the sub-graph is completed, and taking the current partitioning result on which the present round of the game process is based as a final partitioning result.

The present invention provides a game-based method and system for partitioning of a streaming graph at least having the following benefits: (1) Compared with methods and systems of non-streaming partitioning (e.g. METIS), the disclosed method and system can partition streaming graph using local information only, without loading the whole streaming graph into the memory, thus have good scalability and support dynamic graph partitioning; (2) Compared with the existing methods and systems of streaming partitioning (e.g. LDG, FENNEL, and HDRF), the disclosed method and system, when partitioning a batch of edges, calculate the minimal cost function of each edge for multiple rounds, and in every round each edge changes strategies according to the current minimal cost function until convergence where the current strategy selection is fixed. The existing methods and systems of streaming partitioning only calculate the minimal cost function of each edge for a single round before strategy selection. Thus, the disclosed partitioning method and system can provide better partitioning results; (3) The present invention uses partitioned sub-graphs and the final partitioning results of the corresponding sub-graphs obtained through the game process as the train set for training the second pre-partitioning model, so as to reduce computation costs and improve partitioning efficiency.

BRIEF DESCRIPTION OF THE DRAWINGS

FIG. 1a and FIG. 1b illustrate two partitioning schemes of the same sub-graph;

FIG. 1c and FIG. 1d show partition blocks obtained using the partitioning schemes of FIG. 1a and FIG. 1b, respectively;

FIGS. 3a to 3d are line charts of replication factors obtained from real graphs arabic-2005, uk-2002, enwiki-2013 and soc-LiveJournal1 using different algorithms in experiments;

DETAILED DESCRIPTION OF THE INVENTION

Figure 2:
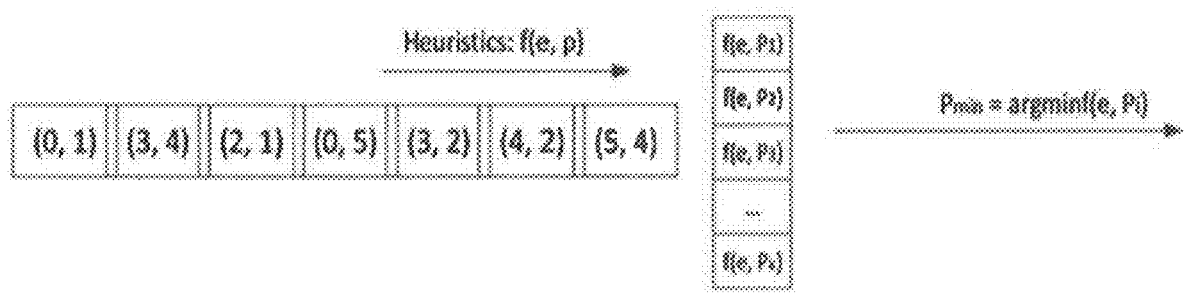
FIG. 2 is a schematic diagram of a stream processing model.

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

Embodiment 1

The present embodiment discloses a game-based method for streaming-graph partitioning. Without causing conflicts or contradiction, the preferred modes for other embodiments may be incorporated into the present embodiment as supplement.

According to one preferred mode, the method may comprise: partitioning a streaming graph using one or more processors.

According to one preferred mode, one or more processors may be configured to: read an edge streaming having a predetermined number of edges in an unpartitioned area of a streaming graph as a sub-graph. In this way, the disclosed method and system can partition streaming graph using local information only, without loading the whole streaming graph into the memory, thus have good scalability and support dynamic graph partitioning.

According to one preferred mode, one or more processors may further be configured to: based on a first pre-partitioning model, pre-partition the edges of the sub-graph to at least two partition blocks as an initial state of a game process. Preferably, a game refers to a behavior that when interaction exists among behaviors of multiple participants, each participant makes a decision favorable to himself/herself according to the information he/she have and his/her cognition to his/her own capability. The game process refers to the process of playing a game. Preferably, the initial state of a game process corresponds to an initial, current partitioning result. In a round of a game, after an edge has moved, the current partitioning result is correspondingly updated, so as to be the basis of the strategy selection for the next edge. In other words, the strategy selection for the current edge is dynamically based on the latest partitioning situations of the other edges. Preferably, in a round of a game, strategy selection is performed once for each edge sequentially. Preferably, when all the edges have their strategy selection done, a round of a game is completed. Preferably, in a round of a game, each edge of a sub-graph may be considered as a player of the game, and a set of all the partition blocks may be considered as a set of strategy selections. In every round of the game, for each edge, the optimal strategy selection in that round is calculated according to a predetermined cost function. When in a certain round, none of the edges changes its strategy selection, the game process reaches Nash Equilibrium, and partitioning of the sub-graph ends. Preferably, in the present invention, the game may be a mixed-strategy game or a pure-strategy game. In a mixed-strategy game, the strategy of a player i refers to a probability distribution $p_i=(p_{i,1}, \ldots, p_{i,m})$ of a strategy set $S_i=(S_1, \ldots, S_m)$, wherein $p_{i,j}$ denotes the probability for player i to select strategy $S_j$, and $\Sigma_{j=1}^{m} p_{i,j}=1$. After player i gives out the strategy (probability distribution) $p_i$, a corresponding move $S_i$ is randomly selected from $S_i$ according to the probability distribution. In a pure-strategy game, a player i has an exact, exclusive strategy $S_i \in S_i$ corresponding to every situation. Therein, $S_i$ is a set of strategies available for the player to select. During the strategy selection, there is no randomness. Preferably, the present invention adopts a pure-strategy game. To select the optimal partition block for the current edge, if there are two or more partition blocks having the same cost function and both being of the minimal value, the optimal partition block having the minimal number is selected for the current edge. In other words, when there are two or more optimal partition blocks for the current edge, the current edge is assigned to the optimal partition block having the minimal number. More preferably, the present invention uses a pure-strategy game so as to achieve better partitioning quality. Preferably, one or more processors may further be configured to: parallelly partition plural sub-graphs and dynamically adjust the number of the sub-graphs that are parallelly partitioned according to real-time computation costs and communication costs. This helps to improve the fluency and overall partitioning efficiency of the system. Particularly, in cases where the system is heavily loaded, the overall outcome is satisfying. Preferably, the one or more processors may further be configured to: when the real-time computation costs exceed a first threshold and/or the communication costs exceed a second threshold and the one or more processors detect an input signal form a first input device and/or a second input device, the number of the parallelly partitioned sub-graphs is coercively decreased. The first input device may be a mouse. The second input device may be a keyboard. This ensures fluent use of the system and improves user experience. Preferably, the step of coercively decreasing the number of the parallelly partitioned sub-graphs may comprise: suspending partitioning of one or more sub-graphs that are being partitioned and lowering the preset number of sub-graphs that could be parallelly partitioned.

According to one preferred mode, the one or more processors may further be configured to: selecting the optimal partition block for each edge of the sub-graph through the game process until the game process becomes convergent.

According to one preferred mode, the game process may comprise: considering a set of all the partition blocks as a set of strategic selections, in every round of the game process, in every round of the game process, calculating for the current edge that is under strategy selection currently its optimal strategy selection in the present round according to partitioning situations of the other edges in a current partitioning result and according to a predetermined cost function, when the current edge is not in the optimal partition block corresponding to the optimal strategy selection, moving the current edge to its optimal partition block and correspondingly updating the current partitioning result as a basis of strategy selection for the next edge and performing the game process again with the latest current partitioning result after the strategy selections for all the edges of the sub-graph has been done; wherein the predetermined cost function is:

$$c(e_{(u,v)}, p_i) = \alpha\beta l(p_i) + (1-\alpha)\left(\frac{1}{d(p_i, u)} + \frac{1}{d(p_i, v)}\right);$$

and wherein $p_{min}=\mathrm{argmin}_{i \in [1,k]} c(e_{(u,v)}, p_i)$ is the optimal partition block where the value of the cost function is minimal, and when the edge $e_{(u,v)}$ is in a partition block that is not its optimal partition block, move the edge $e_{(u,v)}$ from the partition block it has been in to its optimal partition block; wherein $e_{(u,v)}$ denotes the edge connecting vertex u and vertex v, $p_i$ denotes the partition block numbered as i, $i \in [1, k]$, k is the number of the partition blocks, wherein $k \geq 2$ and is an integer, $\alpha$ denotes relative importance between a load balance factor and a replication factor, wherein $\alpha \in (0, 1)$, $\beta$ denotes a factor normalization parameter, $l(p_i)$ denotes the number of edges in partition block $p_i$, $d(p_i, u)$ denotes the degree of vertex u in partition block $p_i$, and $d(p_i, v)$ denotes the degree of vertex v in partition block $p_i$.

According to one preferred mode, the game process may further comprise: if in one round of the game process, none of the edges are moved, determining that the present game process is convergent and partitioning of the sub-graph is completed, and taking the current partitioning result on which the present round of the game process is based as a final partitioning result.

According to one preferred mode, the step of moving the current edge to its optimal partition block and correspondingly updating the current partitioning result as a basis of strategic option for the next edge comprises: the strategic option of the current edge depending on partitioning situations of all the edges other than the current edge in the updated current partitioning result. Preferably, the partitioning situations of the other edge refer to the situations of the partition blocks selected for the other edges.

Embodiment 2

The present embodiment is a further improvement based on Embodiment 1, and the repeated description is omitted herein. Without causing conflicts or contradiction, the preferred modes for other embodiments may be incorporated into the present embodiment as supplement.

According to one preferred mode, the present embodiment discloses a game-based system for streaming-graph partitioning. The system is suitable for performing the steps of the method of the present invention so as to achieve the expected technical effects.

According to one preferred mode, a game-based system for streaming-graph partitioning. The system may comprise: one or more processors.

According to one preferred mode, one or more processors may be configured to: read an edge streaming having a predetermined number of edges in an unpartitioned area of a streaming graph as a sub-graph.

According to one preferred mode, one or more processors may further be configured to: based on a first pre-partitioning model, pre-partition the edges of the sub-graph to at least two partition blocks as an initial state of a game process.

According to one preferred mode, one or more processors may further be configured to: sequentially select an optimal partition block for each edge of the sub-graph through the game process until the game process becomes convergent. In this way, selecting the optimal partition block for each edge according to the current situation is performed in every round.

According to one preferred mode, the game process may comprise: considering a set of all the partition blocks as a set of strategic selections, in every round of the game process, calculating for the current edge that is under strategy selection currently its optimal strategy selection in the present round according to partitioning situations of the other edges in a current partitioning result and according to a predetermined cost function, when the current edge is not in the optimal partition block corresponding to the optimal strategy selection, moving the current edge to its optimal partition block and correspondingly updating the current partitioning result as a basis of strategy selection for the next edge and performing the game process again with the latest current partitioning result after the strategy selections for all the edges of the sub-graph has been done, wherein the predetermined cost function is:

$$c(e_{(u,v)}, p_i) = \alpha\beta l(p_i) + (1-\alpha)\left(\frac{1}{d(p_i, u)} + \frac{1}{d(p_i, v)}\right);$$

and wherein $p_{min}=\text{argmin}_{i\in[1,k]}c(e_{(u,v)}, p_i)$ is the optimal partition block where the value of the cost function is minimal, and when the edge $e_{(u,v)}$ is in a partition block that is not its optimal partition block, move the edge $e_{(u,v)}$ from the partition block it has been in to its optimal partition block; wherein $e_{(u,v)}$ denotes the edge connecting vertex u and vertex v, $p_i$ denotes the partition block numbered as i, i∈[1, k], k is the number of the partition blocks, wherein k≥2 and is an integer, α denotes relative importance between a load balance factor and a replication factor, wherein α∈(0, 1), β denotes a factor normalization parameter, $l(p_i)$ denotes the number of edges in partition block $p_i$, $d(p_i, u)$ denotes the degree of vertex u in partition block $p_i$, and $d(p_i, v)$ denotes the degree of vertex v in partition block $p_i$.

Embodiment 3

The present embodiment is a further improvement based on Embodiment 1, 2 or a combination thereof, and the repeated description is omitted herein. Without causing conflicts or contradiction, the preferred modes for other embodiments may be incorporated into the present embodiment as supplement.

According to one preferred mode, the present embodiment discloses a game-based method for streaming-graph partitioning.

According to one preferred mode, the method may comprise: partitioning a streaming graph using one or more processors. Preferably, the one or more processors may each be at least one of Intel Xeon E5-2670, Intel Xeon X5650, Intel i7 and Intel 3770. Preferably, the streaming graph may be social network graph data or web graph data.

FIG. 1 exemplificatively illustrates edge partitioning of a sub-graph. For simplification, the sub-graph in the drawings has only 6 vertexes. As shown, the stripe vertexes are those being cut after edge partitioning. FIG. 1a and FIG. 1b show an exemplificative sub-graph. FIG. 1c and FIG. 1d display the partitioning results corresponding to the two different schemes respectively. Therein, the filled vertexes are coordinator points and the unfilled vertexes are mirror points. According to the concept of master-slave replication, after a certain time of iteration, if the mirror points are updated, the updated values are written back to the coordinator points. After all the mirror points perform updating to the coordinator points, the coordinator points update all the mirror points with the updated values. The details depend on the specific graph calculation system. During graph calculation, for example, PageRank is calculated. After each iteration, the mirror points and the coordinator points need to perform state synchronization. Therefore, a good graph partitioning result should have balanced loads and minimal replication factor of vertexes $$\frac{1}{|M|}\sum_{m\in M}|Rep(m)|.$$

In a partitioning, assuming that the sum of the replication times of all the vertexes $F=\sum_{m\in M}|Rep(m)|$, F−|M| connections are required to synchronize these replicated vertexes. In FIG. 1c, vertex 1, vertex 4, and vertex 5 are each replicated twice, while vertex 0, vertex 2 and vertex 3 are each replicated once, so the average replication time:

$$\frac{1}{|M|}\sum_{m\in M}|Rep(m)| = \frac{1}{6}(3+6) = 1.5. \ |M| = 6, F = \sum_{m\in M}|Rep(m)| = 9,$$

so the number of the connection bridging the different partition blocks is F−|M|=3. In other words, three connections bridging the different partition blocks are required for maintaining communication. In FIG. 1d, vertex 4 is replicated three times, and vertex 1 is replicated twice, while the other vertexes are each replicated once. The average replication time:

$$\frac{1}{|M|}\sum_{m\in M}|Rep(m)| = \frac{1}{6}(4+3+2) = 1.5. \ |M| = 6,$$

$$F = \sum_{m\in M}|Rep(m)| = 9,$$

so the number of the connection bridging the different partition blocks is F−|M|=3. In other words, three connections bridging the different partition blocks are required for maintaining communication. Although the results of the two scheme as shown in FIG. 1c and FIG. 1d both come to the replication factor $$\frac{1}{|M|}\sum_{m\in M}|Rep(m)| \text{ of } 1.5,$$

they have different load balance factors. In FIG. 1c, the standard deviation of the number of edges in the partition block is smaller than that from FIG. 1d, indicating that the partitioning result of FIG. 1c has its load balance factor more desirable.

According to one preferred mode, one or more processors may be configured to: read an edge streaming having a predetermined number of edges in an unpartitioned area of a streaming graph as a sub-graph. In this way, the present invention can partition streaming graph using local information only, without loading the whole graph into the memory, thus having good scalability. Besides, the disclosed method supports dynamic graph partitioning. Preferably, the predetermined number of edges can be set by the user. Preferably, as mentioned herein, the unpartitioned areas in the streaming graph include areas that have never been partitioned and areas that have been partitioned and have their vertexes and/or edges changed.

According to one preferred mode, the one or more processors may further be configured to: based on a first pre-partitioning model, pre-partition the edges of the sub-graph to at least two partition blocks as an initial state of a game process. Preferably, the first pre-partitioning model only performs preliminary partitioning on the sub-graph. It can be based on various partitioning algorithms. Preferably, the exact number of the partition blocks can be set by the user.

More preferably, the first pre-partitioning model successively generates a random number R for each of the edges of the sub-graph according to a random partitioning rule, and partitions the edge to the partition block $p_R$ numbered corresponding to the random number. Therein, $R \in (1, k)$ and is an integer; k is the number of the partition blocks; and $k \geq 2$ and is an integer. Compared with using a non-random pre-partitioning rule, using the random pre-partitioning rule rids the algorithm of dependence on the input dataset, and reduces complexity and computation costs related to pre-partitioning, while preventing the preliminary partitioning results obtained with certain non-random pre-partitioning rules from affecting the actual partition performance of subsequent game process, which may affect the final partitioning results. While using random partitioning during the phase of pre-partitioning increases the times of subsequent game process, better partitioning results can be obtained.

As proven in experiments, the method of the present invention provides better partitioning results. The four real graphs used in the experiments are listed in the table below.

| No. | Graph | \|M\| | \|E\| |
|---|---|---|---|
| a | arabic-2005 | 22M | 0.6B |
| b | uk-2002 | 19M | 0.3B |
| c | enwiki-2013 | 5.7M | 130M |
| d | soc-LiveJournal1 | 4.8M | 69M |

Figure 4A:
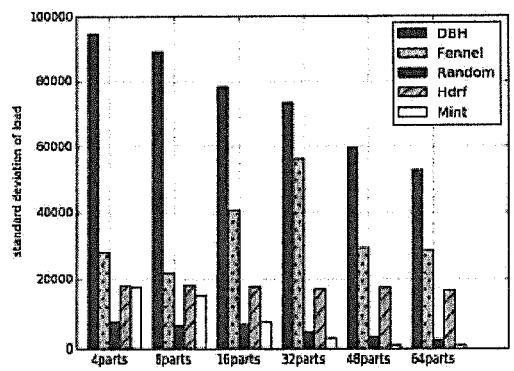
FIGS. 4a to 4d are column charts of load balance factors obtained from real graphs arabic-2005, uk-2002, enwiki-2013 and soc-LiveJournal1 using different algorithms in experiments.
Figure 4B:
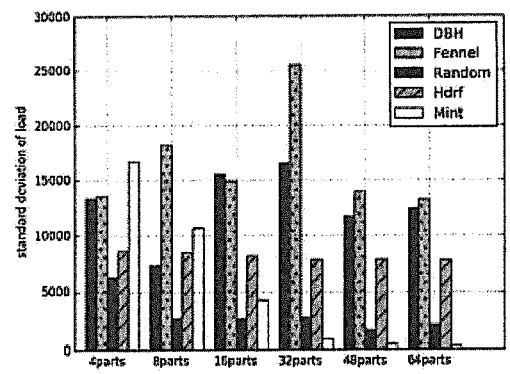
Figure 4C:
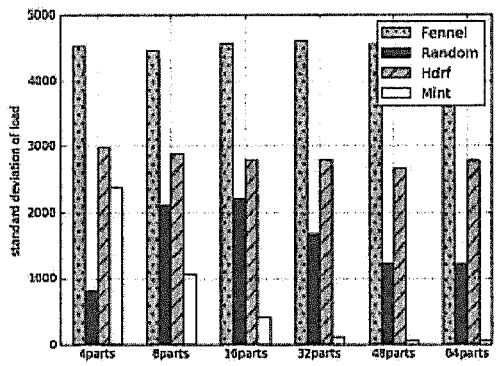
Figure 4D:
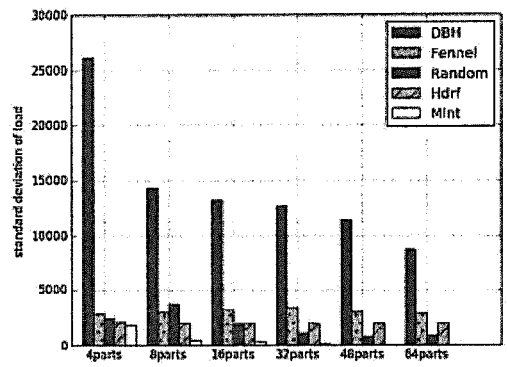

FIGS. 3a to 3d are line charts of replication factors obtained using different well-known conventional algorithms in experiments. FIGS. 4a to 4d are column charts of load balance factors obtained using different well-known, conventional algorithms in experiments. FIGS. 3a to 3d and FIGS. 4a to 4d are obtained by taking real graphs numbered a to b as the streaming graphs in the experiments. Particularly, FIGS. 3a and 4a are from arabic-2005. FIG. 3b and FIG. 4b are from uk-2002. FIG. 3c and FIG. 4c are from enwiki-2013. FIG. 3d and FIG. 4d are from soc-LiveJournal1. In FIG. 3a to 3d, the horizontal axis represents the predetermined number of the partition blocks, and vertical axis represents the replication factor. In FIGS. 4a to 4d, the horizontal axis represents the predetermined number of the partition blocks, and the vertical axis represents the load balance factor. The experiments were performed using six well-known, conventional algorithms, namely DBH, Fennel, Greedy, Random, Hdrf and Mint. Therein, the Mint algorithm adopted the method of the present invention. With the other algorithms, since no game processes were involved, the final partitioning results were obtained after only one round of partitioning. In this experiment, the Mint algorithm implemented random partitioning in the phase of pre-partitioning. Referring to FIGS. 3a to 3d, when four real graphs were taken as samples for experiments, and the partition block number was set as 4, 8, 16, 32, 48 and 64 respectively, all the result of the replication factor obtained by the Mint algorithm using the method of the present invention are the optimal. In FIGS. 4a to 4d, since the results of the Greedy algorithm are too vast to be displayed in the same chart, the column representing the Greedy algorithm is omitted. In addition, since the results of the DBH algorithm with the graph enwiki-2013 are too vast to be displayed in the same chart, the column representing the DBH algorithm is omitted from FIG. 4c. Referring to FIGS. 4a to 4d, when four real graphs were taken as samples for experiments, and the partition block number was set as 4, 8, 16, 32, 48 and 64 respectively, most results of the load balance factor obtained by the Mint algorithm using the method of the present invention are the optimal. Considering the replication factor and the load balance factor together, when four real graphs were taken as samples for experiments, the Mint algorithm using the method of the present invention provided better partitioning performance than the other algorithms. It is to be noted that, while random partitioning was used in pre-partitioning phase with the Mint algorithm in the experiments, it does not mean that the disclosed method can provide the optimal partitioning results only when random partitioning is used for pre-partitioning. For example, the first pre-partitioning model of the present invention may be based on at least one of DBH, Fennel, Greedy, Random and Hdrf algorithms and afterward the game process is used, so as to get results better than those obtained using the first pre-partitioning model alone.

In addition, a synthetic graph generated by an Erdos-Renyi random graph model was used for the experiments. The parameters were set as:

$$\eta = \frac{|E|}{|V|}.$$

A graph was generated randomly for each η value, satisfying that $$\frac{|E|}{|V|}$$

equals to the given η value, which was 15, 16, 17, 18, 19 and 20 respectively. The number of partition blocks was set as k=32, parameters $$\alpha = 0.5, \beta = \frac{k^2}{2}\left(\frac{|V|}{|E|^2}\right), |V| = 10M, |E| = \eta|V|.$$

Figure 5:
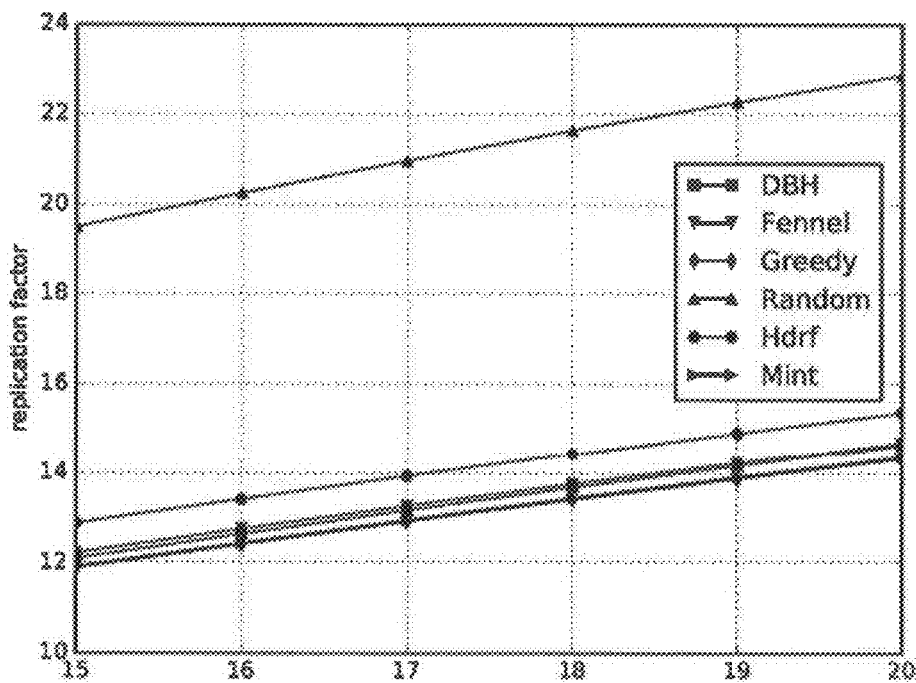
FIG. 5 is a line chart of replication factors obtained from a synthetic graph using different algorithms in experiments.

FIG. 5 is a line chart of replication factors obtained from the synthetic graph using different algorithms in experiments. Therein, the horizontal axis is η. As shown in FIG. 5, with the synthetic graph taken as the experiment sample, when η was 15, 16, 17, 18, 19 or 20 respectively, the results of the replication factor obtained by the Mint algorithm using the disclosed method are close to those obtained by the Greedy algorithm, being the optimal results.

Figure 6:
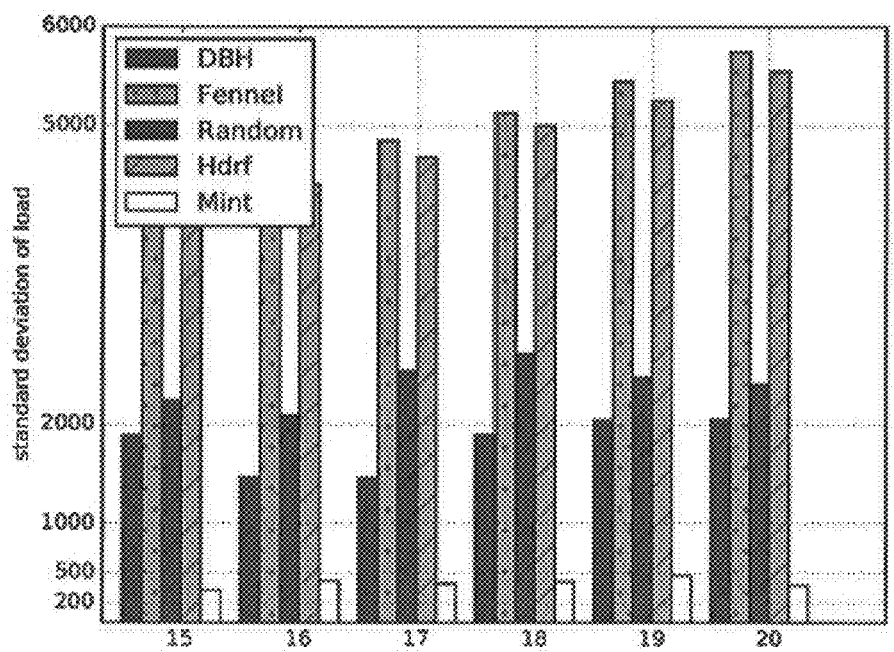
FIG. 6 is a column chart of load balance factors obtained from the synthetic graph using different algorithms in experiments.
Figure 7:
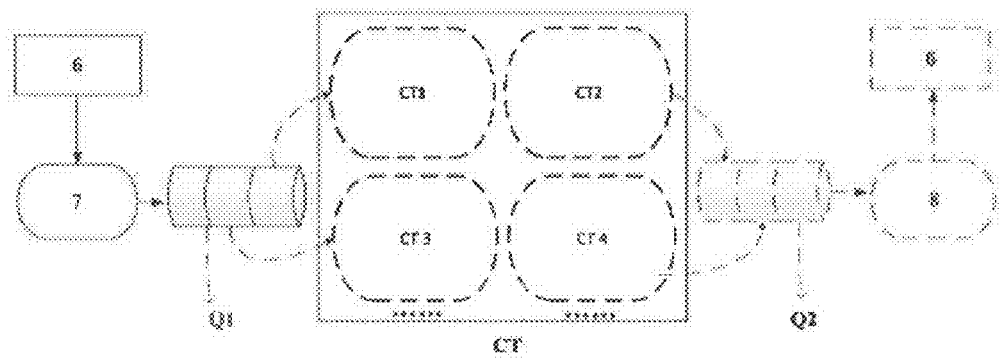
FIG. 7 is a schematic module diagram of a preferred mode of the present invention.

FIG. 6 is a column chart of load balance factors obtained from the synthetic graph using different algorithms in experiments. Therein, the horizontal axis is η. Since the results of the Greedy algorithm are too vast to be displayed in a single chart, the column representing the Greedy algorithm is omitted from FIG. 6. As shown, with the synthetic graph taken as the experiment sample, when η is 15, 16, 17, 18, 19 or 20, the results of the load balance factor obtained by the Mint algorithm using the disclosed method are all optimal. Therefore, considering the replication factor and the load balance factor together, when the synthetic graph was taken as sample for experiments, the Mint algorithm using the method of the present invention provided better partitioning performance than the other algorithms.

According to one preferred mode, one or more processors may further be configured to: repeatedly perform the game process until a round of the game process where none of the edges moves to a different partition block from the partition block it has been in. The conventional streaming graph partitioning methods, when partitioning an edge, only perform calculation on the minimal cost function for merely one round before the strategy selection is made, and the local optimal value so obtained is nevertheless inferior. On the contrary, the present invention leverages information of the strategy selections of the other edges in the current round and repeatedly performs the game process until convergence, so as to get partitioning results better than those obtained by the conventional methods. Referring to FIG. 2, the transversely connected partition blocks form an edge stream. In the edge stream, every unit is one edge $e_{(u,v)}$. The vertically connected partition blocks form a streaming partitioning model. The conventional methods select the partition block of corresponding edge from k partition blocks according to the streaming partitioning model for all the edges one by one, and write the partitioning result into the storage medium. Differently, the method of the present invention has to perform multiple rounds of the game process and can get better partitioning results.

According to one preferred mode, the step of repeatedly performing the game process until none of the edges moves to a different partition block from the partition block it has been in may comprise: determining whether each of the edges of the sub-graph is in its optimal partition block according to the current partitioning result for all the edges one by one. If each of the edges of the sub-graph is in its optimal partition block, the game process converges, and partitioning of the sub-graph ends. The current partitioning result on which this round of the game process is based is taken as the final partitioning result. If each of the edges of the sub-graph is not in its optimal partition block, when the current edge is determined as not being in its optimal partition block, the current edge is moved into its optimal partition block and the current partitioning result is updated correspondingly to be later used as the basis for the determination for the next edge. Then, after the determination for all the edges of the sub-graph has been done, the game process is performed again. The method of the present invention enables changes in strategies for the edges that are not in their optimal partition blocks by running multiple rounds of the game process until convergence, so as to get better final partitioning result.

The game process converges when all of the players in a round of the game process each adopt their optimal strategies, which means in a round of the game process every player is initially in its optimal partition block. Convergence related to the game process of the present invention will be further explained below.

Reduction of communication costs is achieved by taking the replication factor as social welfare.

Definition: for a given game process G, when the strategy selection of player i is changed, $S_i \to S'_i$, if the function $\phi(S)$ satisfies:

$$C_i(S'_i, S_{-i}) - C_i(S_i, S_{-i}) = \phi(S'_i, S_{-i}) - \phi(S_i, S_{-i})$$

the game process G is an exact potential game. The function satisfying the requirement is referred to as a potential function. Theorem: there is pure-strategy Nash Equilibrium in an exact potential game. Proposition: the game process of edge partitioning as defined above is an exact potential game, and thus there is at least one pure-strategy Nash Equilibrium.

Proof: Constructing a Potential Function $$\phi(S) = \alpha\beta \sum_{i=1}^{k} \sum_{j=1}^{l(p_i)} j + (1-\alpha) \sum_{v \in V_b} \sum_{i=1}^{k} H((d(p_i, v))$$

wherein $$H(n) = \sum_{i=1}^{n} \frac{1}{i}$$

is a harmonic sequence, $l(p_i)$ denotes the number of edges included in partition block $p_i$ currently, $d(p_i, v)$ denotes the number of edges in partition block $p_i$ that have v as a vertex, which means the degree of vertex v in partition block $p_i$. When the partition block selection of edge e changes, $S_e \to S'_e$, the variation of the first term $\phi_1(S) = \alpha\beta\Sigma_{i=1}^{k}\Sigma_{j=1}^{l(p_i)}j$ in $\phi(S)$ may be calculated using:

$$\Delta\phi_1(S) = \alpha\beta\left[\sum_{j=1}^{l(S'_e)+1} j + \sum_{j=1}^{l(S_e)-1} j\right] - \left[\sum_{j=1}^{l(S'_e)} j + \sum_{j=1}^{l(S_e)} j\right] = \alpha\beta[l(S'_e) + 1 - l(S_e)]$$

Considering the second term $\phi_2(S) = (1-\alpha)\Sigma_{v \in V_b}\Sigma_{i=1}^{k}H((d(p_i, v))$ in $\phi(S)$, when only the edge e(u,v) has a change in partition block selection and all the other edges remain their current selections, the only related vertexes in $\phi_2(S)$ are u and v, and the only related partition blocks are $S_e$ and $S'_e$. Due to symmetry of u and v in $\phi_2(S)$, only the variation introduced by the vertex u in $\phi_2(S)$ when the partition block selection of edge e changes, $S_e \to S'_e$, is calculated:

$$\Delta\phi_2^u(S) = (1-\alpha)[H(d(S'_e, u) + 1) + H(d(S_e, u) - 1)] - (1-\alpha)[H(d(S'_e, u)) + H(d(S_e, u))] = (1-\alpha)\left[\frac{1}{d(S'_e, u)+1} - \frac{1}{d(S_e, u)}\right]$$

Due to symmetry of u and v in $\phi_2(S)$, the sum of variations introduced by vertexes u and v is:

$$\Delta\phi_2(S) = (1-\alpha)\left[\frac{1}{d(S'_e, u)+1} - \frac{1}{d(S_e, u)}\right] + (1-\alpha)\left[\frac{1}{d(S'_e, v)+1} - \frac{1}{d(S_e, v)}\right]$$

Therefore, when the partition block selection of edge e changes $S_e \to S'_e$, the total variation of the potential function $\phi(S)$ is:

$$\phi(S'_e, S_{-e}) - \phi(S_e, S_{-e}) = \alpha\beta[l(S'_e) + 1 - l(S_e)] + (1-\alpha)\left[\frac{1}{d(S'_e, u)+1} - \frac{1}{d(S_e, u)} + \frac{1}{d(S'_e, v)+1} - \frac{1}{d(S_e, v)}\right]$$

wherein $S_{-e}$ denotes the vector formed by the partition block selections of all the edges other than edge e. On the other hand, when the partition block selection of edge e changes $S_e \to S'_e$, the change in the individual cost function of edge e is:

$$C_e(S'_e, S_{-e}) - C_e(S_e, S_{-e}) = \alpha\beta[l(S'_e) + 1 - l(S_e)] + (1-\alpha)\left[\frac{1}{d(S'_e, u)+1} - \frac{1}{d(S_e, u)} + \frac{1}{d(S'_e, v)+1} - \frac{1}{d(S_e, v)}\right] = \phi(S'_e, S_{-e}) - \phi(S_e, S_{-e})$$

Hence, the game process of the present invention is an exact potential game, and has at least one pure-strategy Nash Equilibrium. It is to be noted that, according to existing conclusions, when the player set is limited and the strategy set for every player is limited, a mixed-strategy game must have a mixed-strategy Nash Equilibrium. Yet existence of a pure-strategy Nash Equilibrium is much more demanding, as it requires proving that the game process is an exact potential game. As described previously, the challenge in doing so lies in how to construct a corresponding potential function that satisfies the definition of an exact potential game according to the individual cost function. A pure-strategy game whose convergence is not proven may lead to continuous repeat of the game process while no final partitioning results can be obtained.

According to one preferred mode, the step of repeatedly performing the game process until none of the edges is moved to a different partition block from the partition block it has been in throughout a round of the game process may comprise: selecting an unselected edge in the sub-graph as the current edge; determining whether the current edge is in its optimal partition block according to the partitioning situation of other edges in the latest current partitioning results; if the current edge is in its optimal partition block, maintaining the current partitioning result as the basis for determination of the next edge unchanged, repeating the current step until determination of all the edges in the sub-graph has been done, and entering the next step; if the current edge is not in its optimal partition block, moving the current edge to its optimal partition block, correspondingly updating the current partitioning result as the basis for determination of the next edge, repeating the current step until determination of all the edges in the sub-graph has been done and entering the next step; after the determination for all the edges in the sub-graph has been done, determining whether there is any edge being moved for not being in its optimal partition block; if there is an edge being moved for not being in its optimal partition block, using the updated current partitioning result to perform the game process again; if there is not any edge being moved for not being in its optimal partition block, the game process being convergent, ending partitioning of the sub-graph, and taking the current partitioning result on which this round of the game process is based as the final partitioning result. In this way, in every round, throughout the process of checking whether every edge in the sub-graph is in its optimal partition block edge by edge, the next round of the game process is not performed immediately no matter whether there is any edge moved. Instead, the next round of the game process is only performed until the determinations for all the edges in a round has been done and it is confirmed that there were edges moved, which means convergence has not been reached, in addition, after one edge is moved, the determination of the optimal partition block for the next edge is based on the updated current partitioning result. This helps to effectively reduce rounds of the game process and improve partitioning efficiency.

Preferably, the method further comprises configuring the one or more processors to set two global values, machOfEdge and machOfVertex, for recording the partitioning situations. The global value machOfEdge is a HashMap that is used to stored key-value pairs in the form of <e, pid>, for recording the partitioning results, meaning that edge e is currently partitioned to a partition block having an id of pid, machOfEdge is emptied when partitioning of a sub-graph is completed and then starts to record the partitioning results of the next sub-graph. machOfVertex is a nested HashMap that is used to store key-value pairs in the form of <v, <pid, cnt>>, for recording how many times vertex v appears in each partition block. For calculation of the $Rep_{avg}$, the only thing to consider is whether the partition block contains any replicated vertex of v.

Preferably, throughout the process of partitioning, when edge e(u, v) has to be moved to its optimal partition block $p_{min}$ from the partition block $p_{original}$ it has been in, the value corresponding to the key e in machOfEdge is changed into $p_{min}$. repU=machOfVertex.get(u), repV=machOfVertex.get(v) are for recording the replication situations of u and v in each partition block. The times of replication of vertex u and vertex v in $p_{original}$ and $p_{min}$ are written as $cntUP_o$, $cntUP_m$, $cntVP_o$, $cntVP_m$, respectively. The transit of the edge may be accomplished using the following operation: repU.put($p_{min}$, $cntUP_m$+1) adding 1 to the time of replication of u in $p_{min}$; repU.put($p_{original}$, $cntUP_o$−1); reducing 1 from the time of replication of u in $p_{original}$ 1; repV.put($p_{min}$, $cntUP_m$+1); adding 1 to the time of replication of v in $p_{min}$; and repV.put($p_{original}$, $cntUP_o$−1); reducing 1 from the time of replication of v in $p_{original}$.

According to one preferred mode, the predetermined cost function may be:

$$c(e_{(u,v)}, p_i) = \alpha\beta l(p_i) + (1-\alpha)\left(\frac{1}{d(p_i, u)} + \frac{1}{d(p_i, v)}\right).$$

The optimal partition block where the value of the minimal cost function is obtained can be written as $p_{min}=\text{argmin}_{i\in[1,k]}c(e_{(u,v)}, p_i)$. When partition block where edge $e_{(u,v)}$ has been in is not its optimal partition block, edge $e_{(u,v)}$ is moved to its optimal partition block. $e_{(u,v)}$ denotes the edge connecting vertex u and vertex v. $p_i$ denotes the partition block numbered as i. $i\in[1,k]$, k is the number of partition blocks. $k\geq 2$ and is an integer. $\alpha$ denotes relative importance between a load balance factor and a replication factor, $\alpha \in (0,1)$. $\beta$ denotes a factor normalization parameter. $l(p_i)$ denotes the number of edges in partition block $p_i$. $d(p_i, u)$ denotes the degree of vertex u in partition block $p_i$. $d(p_i, v)$ denotes the degree of vertex v in partition block $p_i$. In this way, the present invention calculates the minimal cost function for each edge in multiple rounds of the game process. In every round every edge changes its strategy according to the current minimal cost function until convergence where the current strategy selection is fixed, so as to get better partitioning results. The known streaming partitioning methods only calculate the minimal cost function of each edge for a single round before making the strategy selection, and the partitioning results so obtained are inferior.

According to one preferred mode, the factor normalization parameter $$\beta \in \left[\frac{|M|}{|E|^2}, \frac{k^2|M|}{|E|^2}\right].$$

|M| is the number of vertexes in the sub-graph. |E| is the number of edges in the sub-graph. Preferably, the value of $\beta$ is determined using the method below: the cost function of every player is:

$$c(e_{(u,v)}, p_i) = \alpha\beta l(p_i) + (1-\alpha)\left(\frac{1}{d(p_i, u)} + \frac{1}{d(p_i, v)}\right);$$

And the social welfare of the whole game process is:

$$C(S) = \sum_{e \in E} c(e, s_e) = \sum_{e \in E} \alpha\beta l(s_e) + (1-\alpha)\left(\frac{1}{d(s_e, u)} + \frac{1}{d(s_e, v)}\right) =$$

$$\alpha\beta \sum_{i=1}^{k} l(p_i)^2 + (1-\alpha) \sum_{m \in M} |Rep(m)|.$$

wherein strategic vector $S=(s_1, \ldots, s_N)$ denotes the strategy selections of N edges at certain moment. The N edges are regarded as N players. The strategy selection of edge e is $s_e$, or, the edge selects the partition block numbered as $s_e$. Rep(m) denotes the number of times that vertex m is replicated. E denotes the set of edges in the batch, and M denotes the sets of vertexes in the batch. When $\alpha=0.5$, the load balance factor and the replication factor shall have the same value:

$$\beta \sum_{i=1}^{k} l(p_i)^2 = \sum_{m \in M} |Rep(m)|$$

Regarding to the first term in the social welfare, since $\Sigma_{i=1}^{k} l(p_i) = |E|$, the maximum value of $\Sigma_{i=1}^{k} l(p_i)^2$ is $|E|^2$, meaning that all the edges are assigned into the same partition block, and the minimal value is $$\frac{|E|^2}{k},$$

meaning that the partition blocks have the same number of edges. Regarding to the second term of the social welfare, $\Sigma_{v \in V}|Rep(m)|$, its maximum value is k|M|, meaning that because there are only k partition blocks, every vertex at most appears in all partition blocks, and its minimal value is |M|, meaning that all the vertexes appear in one partition block. Thus, $$\beta_{max} = \frac{k^2|M|}{|E|^2}, \beta_{min} = \frac{|M|}{|E|^2}.$$

When a batch of edges is loaded into the memory, |E| and |M| are both known constants, so simply inputting coefficients of 1 to $k^2$ is enough.

According to one preferred mode, the one or more processors are further configured to: acquire plural sub-graphs and the final partitioning results of these sub-graphs to form a train set; use the train set to train the second pre-partitioning model; after the training has been conducted for a predetermined number of times, use the second pre-partitioning model instead of the first pre-partitioning model to pre-partition the sub-graphs to be partitioned. In this way, the trained second pre-partitioning model can generate partitioning results similar to those obtained through the game process of the present invention in advance in a pre-partitioning phase and afterward the game process is performed to generate the final partitioning results, thereby reducing the times of performing the game process and the computation costs required by the partitioning process, and in turn significantly improve the partitioning efficiency of the present invention. The present invention does not replace the pre-partitioning model until the second pre-partitioning model has been trained for a predetermined times. This helps to prevent premature use of the second pre-partitioning model that has not been well trained, thereby preventing waste of computation resources and decrease of partitioning efficiency.

According to one preferred mode, the step of reading the edge streaming containing a predetermined number of edges in the unpartitioned area of the streaming graph as the sub-graph is performed according to a stream processing model. In this way, the required sub-graph can be quickly obtained. Preferably, the processing based on a stream processing model may be realized by using an existing system based on a stream processing model, such as a Storm system or a Flink system based on a stream processing model commonly used for industrial purposes.

Embodiment 4

The present embodiment is a further improvement based on Embodiment 1, 2, 3 or a combination thereof, and the repeated description is omitted herein. Without causing conflicts or contradiction, the preferred modes for other embodiments may be incorporated into the present embodiment as supplement.

According to one preferred mode, the present embodiment discloses a game-based system for streaming-graph partitioning. The system is suitable for performing the steps of the method of the present invention so as to achieve the expected technical effects.

According to one preferred mode, the system may comprise: one or more processors.

Preferably, the one or more processors may further be configured to: repeatedly perform the game process until a round of the game process where none of the edges is moved to another partition block from the partition block it is in.

Embodiment 5

The present embodiment is a further improvement based on Embodiment 1, 2, 3, 4, or a combination thereof, and the repeated description is omitted herein. Without causing conflicts or contradiction, the preferred modes for other embodiments may be incorporated into the present embodiment as supplement.

According to one preferred mode, the present embodiment discloses a game-based system for streaming-graph partitioning. The system is suitable for performing the steps of the method of the present invention so as to achieve the expected technical effects.

Referring to FIG. 5, the system may comprise at least one of a storage medium 6, a reading module 7, a first blocking queue module Q1, a second blocking queue module Q2, a partitioning module CT and a writing module 8. Preferably, the partitioning module CT may comprise one or more partitioning units. For example, it may comprise a first partitioning unit CT1, a second partitioning unit CT2, a third partitioning unit CT3 and a fourth partitioning unit CT4 for simultaneously partitioning multiple sub-graphs. Preferably, the first blocking queue module Q1, the second blocking queue module Q2, the reading module 7, the partitioning module CT and the writing module 8 may each be at least one of an application specific integrated circuit (ASIC), a FPGA, a CPU, a general computer and any other hardware equivalent that can process and/or transmit data. The storage medium 6 may be at least one of a memory stick, a solid-state hard disk and a mechanical hard disk.

According to one preferred mode, the reading module 7 reads a batch of edges each time from the streaming graph of the storage medium 6 according to the batch size B input by the user, and the batch of edges are taken as a sub-graph and are filled into the first blocking queue module Q1.

According to one preferred mode, every partitioning unit may extract a sub-graph whose edge number is B from the first blocking queue module Q1, run partitioning logic, and at last fill the partitioning results of the sub-graph into one element of the second blocking queue module Q2. Preferably, the partitioning result of each edge is a key-value pair having a content of <e, i>, which means that the edge e is stored in the partition block whose id is i. The one element of the second blocking queue module Q2 comprises the partitioning results of all edges in a sub-graph. Preferably, the partitioning unit may be configured to initialize a game process, and pre-partition edges of a graph to k partition blocks. Preferably, the partitioning unit may further be configured to: activate the game process, traversale all edges in the batch in each round of the game process. For each edge, the optimal partition block is calculated based on the current partition block selections of other edges. If in certain round, all the edges have their current selection of partition blocks unchanged, the game process reaches Nash Equilibrium and edge partitioning of the batch ends.

According to one preferred mode, the writing module 8 extract partitioning results of a batch from the second blocking queue module Q2 each time, and writes it into the storage medium 6.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A game-based method for streaming-graph partitioning, the method comprising: partitioning a streaming graph using one or more processors, the one or more processors being configured to: read an edge streaming having a predetermined number of edges in an unpartitioned area of the streaming graph as a sub-graph; based on a first pre-partitioning model, pre-partition the edges of the sub-graph to at least two partition blocks as an initial state of a game process; and sequentially select an optimal partition block for each edge of the sub-graph through the game process until the game process becomes convergent; wherein the game process comprises: considering a set of all the partition blocks as a set of strategy selections, in every round of the game process, calculating for an edge that is currently under strategy selection its optimal strategy selection in a present round of the game process according to partitioning situations of other edges in a current partitioning result and according to a predetermined cost function, and when the edge currently under strategy selection is not in an optimal partition block corresponding to an optimal strategy selection, moving the edge currently under strategy selection to its optimal partition block and correspondingly updating the current partitioning result as a basis of strategy selection for a next edge and performing the game process again with a latest current partitioning result after the strategy selections for all the edges of the sub-graph has been done; wherein the predetermined cost function is:

$$c(e_{(u,v)}, p_i) = \alpha\beta l(p_i) + (1-\alpha)\left(\frac{1}{d(p_i, u)} + \frac{1}{d(p_i, v)}\right);$$

and wherein $P_{min} = \mathrm{argmin}_{i \in [1,k]} c(e_{(u,v)}, p_i)$ is the optimal partition block when the value of the cost function is minimal, and when an edge $e_{(u,v)}$ is in a partition block that is not its optimal partition block, move the edge $e_{(u,v)}$ from the partition block it has been in to its optimal partition block; wherein $e_{(u,v)}$ denotes the edge connecting vertex u and vertex v, $p_i$ denotes the partition block numbered as i, $i \in [1, k]$, k is the number of the partition blocks, wherein $k \geq 2$ and is an integer, $\alpha$ denotes relative importance between a load balance factor and a replication factor, wherein $\alpha \in (0,1)$, $\beta$ denotes a factor normalization parameter, $l(p_i)$ denotes the number of edges in partition block $p_i$, $d(p_i, u)$ denotes the degree of vertex u in partition block $p_i$, and $d(p_i, v)$ denotes the degree of vertex v in partition block $p_i$.

2. The method of claim 1, wherein the game process further comprises: if in one round of the game process, none of the edges are moved: determining that the present game process is convergent and partitioning of the sub-graph is completed: and taking the current partitioning result on which the present round of the game process is based as a final partitioning result.

3. The method of claim 2, wherein the step of moving the current edge to its optimal partition block and correspondingly updating the current partitioning result as a basis of strategy selection for the next edge comprises: the strategy selection of the current edge depending on partitioning situations of all the edges other than the current edge in the updated current partitioning result.

4. The method of claim 3, wherein in the factor normalization parameter $\beta \in$ $$\beta \in \left[ \frac{|M|}{|E|^2}, \frac{k^2|M|}{|E|^2} \right].$$

$|M|$ is the number of vertexes in the sub-graph, and $|E|$ is the number of edges in the sub-graph.

5. The method of any of claim 3, wherein the first pre-partitioning model successively generates a random number R for the edge of the sub-graph according to a random partitioning rule, and partitions the edge to partition block $p_R$ that is numbered corresponding to the random number, wherein $R \in [1, k]$ and is an integer, k is the number of the partition blocks, and $k \geq 2$ and is an integer.

6. The method of claim 5, wherein the one or more processors are further configured to: acquire a plurality of the sub-graphs and the final partitioning results of these sub-graphs to form a train set: use the train set to train a second pre-partitioning model; and after the training has been conducted for a predetermined number of times, use the second pre-partitioning model instead of the first pre-partitioning model to pre-partition the sub-graph to be partitioned.

7. The method of any of claim 3, wherein the step of reading the edge streaming having the predetermined number of edges in the unpartitioned area of the streaming graph as the sub-graph is performed according to a stream processing model.

8. A game-based system for streaming-graph partitioning, comprising; one or more processors; the one or more processors being configured to: read an edge streaming having a predetermined number of edges in an unpartitioned area of a streaming graph as a sub-graph; based on a first pre-partitioning model, pre-partition the edges of the sub-graph to at least two partition blocks as an initial state of a game process; and sequentially select an optimal partition block for each edge of the sub-graph through the game process until the game process becomes convergent; and wherein the game process comprises: considering a set of all the partition blocks as a set of strategy selections, in every round of the game process, calculating for an edge that is under currently strategy selection its optimal strategy selection in a present round of the game process according to partitioning situations of other edges in a current partitioning result and according to a predetermined cost function, and when the edge currently under strategy selection is not in an optimal partition block corresponding to an optimal strategy selection, moving the edge currently under strategy selection to its optimal partition block and correspondingly updating the current partitioning result as a basis of strategy selection for a next edge and performing the game process again with a latest current partitioning result after the strategy selections for all the edges of the sub-graph has been done; wherein the predetermined cost function is:

$$c(e_{(u,v)}, p_i) = \alpha \beta l(p_i) + (1-\alpha)\left(\frac{1}{d(p_i, u)} + \frac{1}{d(p_i, v)}\right);$$

and wherein $p_{min} = \mathrm{argmin}_{i \in [1,k]} c(e_{(u,v)}, p_i)$ is the optimal partition block when the value of the cost function is minimal, and when an edge $e_{(u,v)}$ is in a partition block that is not its optimal partition block, moving the edge $e_{(u,v)}$ from the partition block it has been in to its optimal partition block; wherein $e_{(u,v)}$ denotes the edge connecting vertex u and vertex v, $p_i$ denotes the partition block numbered as i, $i \in [1, k]$, k is the number of the partition blocks, wherein $k \geq 2$ and is an integer, $\alpha$ denotes relative importance between a load balance factor and a replication factor, wherein $\alpha \in (0,1)$, $\beta$ denotes a factor normalization parameter, $l(p_i)$ denotes the number of edges in partition block $p_i$, $d(p_i, u)$ denotes the degree of vertex u in partition block $p_i$, and $d(p_i, v)$ denotes the degree of vertex v in partition block $p_i$.

9. The system of claim 8, wherein the game process further comprises: if in one round of the game process, none of the edges are moved: determining that the present game process is convergent and partitioning of the sub-graph is completed; and taking the current partitioning result on which the present round of the game process is based as a final partitioning result.

* * * * *